United States Patent [19]

Onodera et al.

[11] 4,399,376

[45] Aug. 16, 1983

[54] HIGH FREQUENCY SWITCHING CIRCUIT

[75] Inventors: Toshihiro Onodera, Kunitachi; Koichiro Inomata, Yokohama; Michio Hasegawa, Machida; Yoshio Takamura; Seiji Kajiwara, both of Yokohama; Shoichi Higo, Zama, all of Japan

[73] Assignee: Tokyo Shibaura Denki Kabushiki Kaisha, Kawasaki, Japan

[21] Appl. No.: 349,093

[22] Filed: Feb. 16, 1982

[30] Foreign Application Priority Data

Feb. 17, 1981 [JP] Japan .................................. 56-21937

[51] Int. Cl.³ ....................... H03K 3/49; H03K 17/60; H03K 19/16

[52] U.S. Cl. .................................... 307/415; 307/253; 307/314

[58] Field of Search ............... 307/415, 414, 419, 253, 307/268, 314; 328/35, 36, 65

[56] References Cited

U.S. PATENT DOCUMENTS

| | | | |
|---|---|---|---|
| 2,787,755 | 4/1957 | Smith | 307/419 |
| 3,612,895 | 10/1971 | Niedra | 307/419 |

*Primary Examiner*—Michael L. Gellner
*Assistant Examiner*—Todd E. De Boer
*Attorney, Agent, or Firm*—Cushman, Darby & Cushman

[57] ABSTRACT

A switching element, a transformer having a primary winding connected through said switching element to a DC power supply and a resonance capacitor connected in parallel with the primary winding of said transformer constitute a single-ended switching circuit. A magnetic amplifier is connected between the secondary side circuit of the transformer of the single-ended switching circuit and a rectifying/smoothing circuit, thus forming a high frequency switching circuit.

5 Claims, 14 Drawing Figures

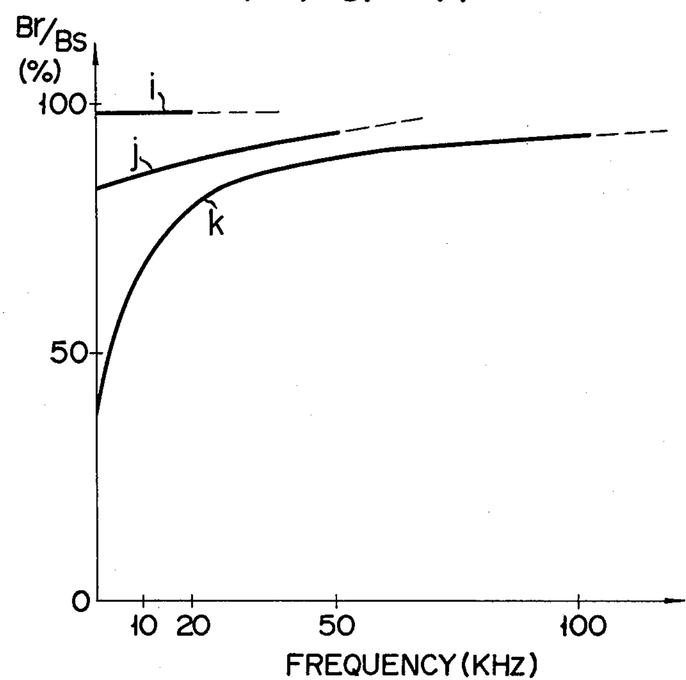
F I G. 11
Br/Bs (%)
100
50
0
i
j
k
10 20 50 100
FREQUENCY (KHZ)
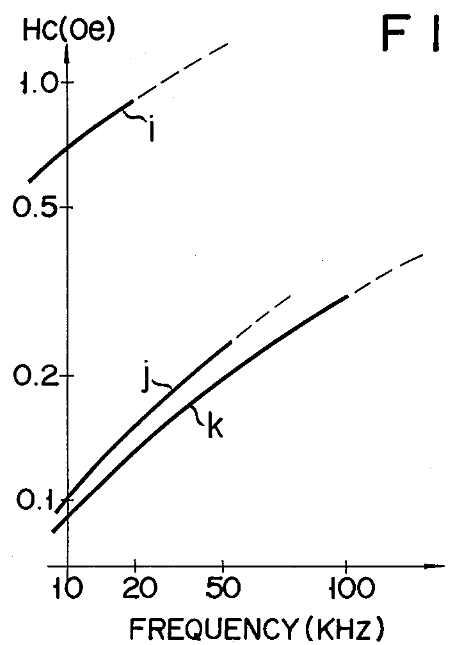
F I G. 12
Hc(Oe)
1.0
0.5
0.2
0.1
i
j
k
10 20 50 100
FREQUENCY (KHZ)

HIGH FREQUENCY SWITCHING CIRCUIT

BACKGROUND OF THE INVENTION

This invention relates to a high frequency switching circuit and, more particularly, a high frequency switching circuit using a single-ended switching circuit.

As the power source for computer system peripheral units and conventional communication devices, low-voltage, high-current stabilized power sources have been used. These power sources are, in many cases, switching power sources, which have the advantages of small size, light weight and high frequency. Among these switching power sources, those which make use of voltage or current resonance waves have sufficient switching efficiency of main switching element (such as a transistor, a thyristor, a MOSFET, etc.) and can operate with low noise. As one variety of the switching circuit used for the prior art switching power source, there is a sub-class-E switching circuit. This subclass-E switching circuit is constructed such that a voltage having a waveform corresponding to the arc of the resonance waveform appears between the terminals of a switching element. To this end, the switching cycle and conduction period of the switching element and constants of external circuitry are set to meet predetermined conditions. Of such subclass-E switching circuit, those which use a voltage resonance waveform have power conversion efficiencies in excess of 90% at the operating frequency of several 100 kHz. As another variety of the switching circuit of the aforementioned kind, there is a half-bridge type switching circuit. In this switching circuit, the peripheral circuitry is constructed such that the waveform of current flowing through a switching element corresponds to the resonance waveform. This type of switching circuit has an advantage in that a quenching circuit can be omitted in case when the switching element is a thyristor. In this switching circuit, however, the resonance frequency is determiend by the combination of the rating values of elements constructing an external circuit. Therefore, when this switching circuit is used for a stabilized power source or a power amplifier, the control of the output power is complicated. For example, with a forward type switching circuit the power control can be obtained by merely changing the conducting period of the switching element, but with a switching circuit which makes use of a resonance waveform it is necessary to control the switching cycle in a predetermined relation to the conduction period while controlling the conduction period in order to obtain power control while maintaining the resonance waveform. For this reason, the power control is complicated, that is, the control circuit is complicated. Further, although power control may be obtained with a complicated power control circuit, the available range of control is narrow, and a desired stabilized power source or power amplifier cannot be obtained.

SUMMARY OF THE INVENTION

An object of the invention is to provide a voltage resonance type high frequency switching circuit, which permits power control to be obtained simply and over a wide range.

With the high frequency switching circuit according to the invention, a single-ended switching circuit is constructed by connecting a switching element circuit between a DC power supply and the primary winding of a transformer and connecting a resonance capacitor in parallel with the primary winding of the transformer. A magnetic amplifier is connected between the secondary winding of the transformer of the single-ended switching circuit and a rectifying/smoothing circuit. The rectifying/smoothing circuit includes a rectifying element for rectifying the output of the magnetic amplifier and a filtering capacitor connected to the rectifying element and in parallel wiht a load, for smoothing the output of the rectifying element.

With the above frequency switching circuit, the saturable reactor of the magnetic amplifier is saturated when the secondary output voltage of the transformer goes positive (or negative) and is reset when the secondary output goes negative (or positive).

BRIEF DESCRIPTION OF THE DRAWINGS

FIG. 3 is a circuit diagram showing an equivalent circuit to the circuit of FIG. 1 when a switching element therein is turned on;

FIG. 11 is a graph showing the relation of the rectangular ratio to frequency for various magnetic materials;

FIG. 12 is a graph showing the relation of the coercive force to frequency for various magnetic materials;

DETAILED DESCRIPTION OF THE PREFERRED EMBODIMENTS

Figure 1:
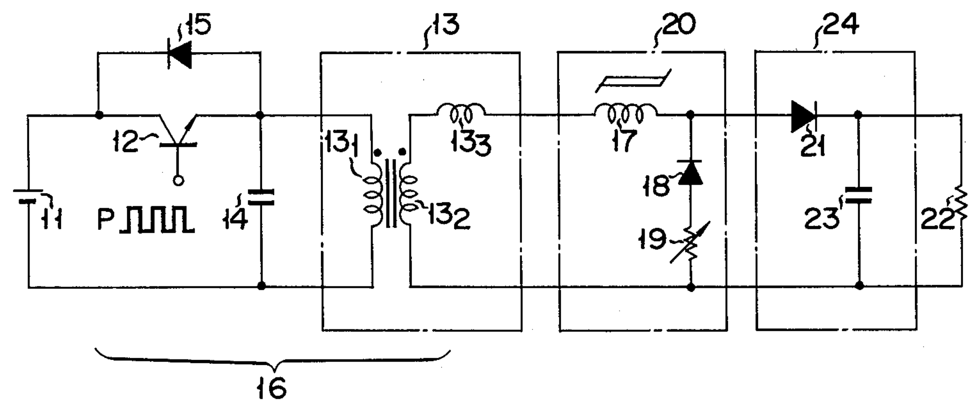
FIG. 1 is a circuit diagram showing one embodiment of the voltage resonance type high frequency switching circuit according to the invention.
Figure 3:
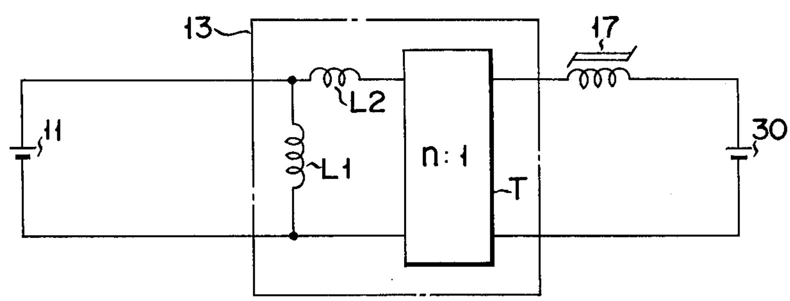

Referring to FIG. 1, a DC power supply 11 is connected at its positive terminal to the collector of a transistor 12 as a switching element. The emitter of the transistor 12 is connected through the primary winding $\mathbf{13}_1$ of a transformer 13 to the negative terminal of the power supply 11. A resonance capacitor 14 is connected in parallel with the primary winding $\mathbf{13}_1$, and a damper diode 15 is connected between the collector and emitter of the transistor 12 in a reverse direction. The transistor 12, transformer 13, resonance capacitor 14 and damper diode 15 constitute a single-ended switching circuit 16.

The secondary winding $13_2$ of the transformer 13 is connected at one end through a coil $13_3$ to one end of a saturable reactor 17, the other end of which is connected to the cathode of a reflux diode 18. The anode of the diode 18 is connected through the variable resistor 19 to the other terminal of the secondary winding $13_2$. The saturable reactor 17, reflux diode 18 and a variable resistor 19 constitute a magnetic amplifier 20.

The other terminal of the saturable reactor 17 is connected to the anode of a rectifier diode 21, and the cathode of the diode 21 is connected through a load 22 to the other terminal of the secondary winding $13_2$ of the transformer 13. A filtering capacitor 23 is connected in parallel with the load 22, and the filtering capacitor 23 and rectifier diode 21 constitute a rectifying/smoothing circuit 24.

In the single-ended switching circuit 16, the switching cycle and conducting period of the transistor 12, capacitance of the resonance capacitor 14, excitation inductance of the transformer 13, etc. are set to values related to one another such that the voltage applied between the collector and emitter of the transistor 12 has a waveform corresponding to the arc of sine wave. Also, the ampere-turns of the saturable reactor 17 is set in correspondence to the positive output voltage of the secondary winding of the transformer 13 such that the self feedback of the magnetic amplifier 20 is possible.

Prior to describing the operation of the voltage resonance type high frequency switching circuit of the above construction, the following is given to facilitate the understanding of the invention.

Figure 2:
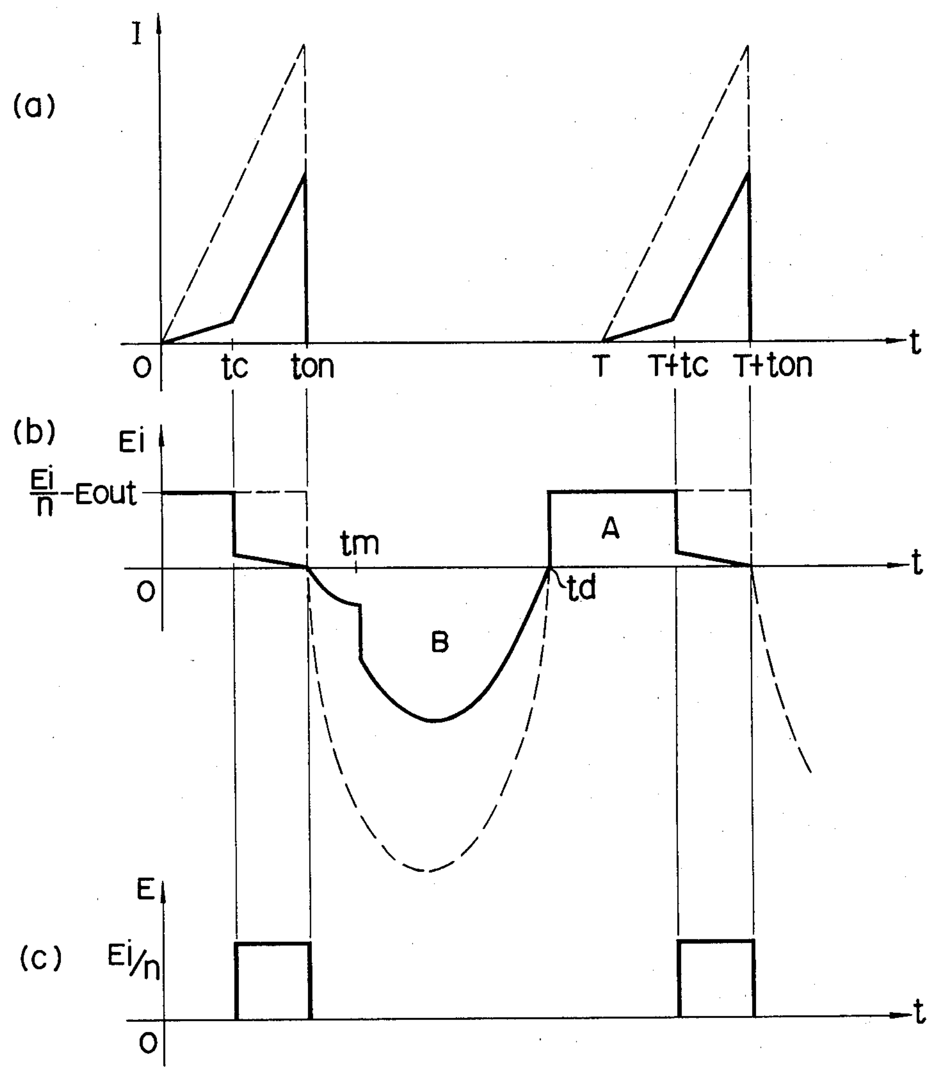
FIG. 2 is a timing chart illustrating the operation of the high frequency switching circuit shown in FIG. 1.

If the magnetic amplifier 20 is omitted from the high frequency switching circuit of FIG. 1, i.e., if the secondary side output terminals of the transformer 3 are directly connected to the rectifying/smoothing circuit 24, a voltage having a waveform as shown by a dashed plot in (a) in FIG. 2, appears on the secondary side of the transformer 13. When the transistor 12 is triggered at an instant t0, current from the power supply 11 is supplied to a parallel composite inductance constituted by the excitation inductance L1 and leakage inductance L2 of the transformer 13. At this time, the current flowing through the composite inductance increases linearly as shown by the dashed plot in (a) in FIG. 2. When the transistor 12 is cut off at an instant $t_{on}$, the current that has been flowing through the composite inductance turns to flow into the resonance capacitor 14 due to the inertia. The direction of the in-flow current at this time is negative with respect to the power supply 11, and thus the voltage across the resonance capacitor 14 is gradually reduced from the value of the voltage (+Ein) of the power supply 11 and eventually becomes negative. When the capacitor terminal voltage reaches the negative maximum, it turns to increase and ultimately reaches +Ein again, as shown by a dashed plot in (b) in FIG. 2. The waveform of this terminal voltage across the resonance capacitor 14 is featured by the fact that the ratio between the area of the positive voltage waveform and the area of the negative voltage waveform is comparatively small, of the order of 0.5 to 2.

Figure 4:
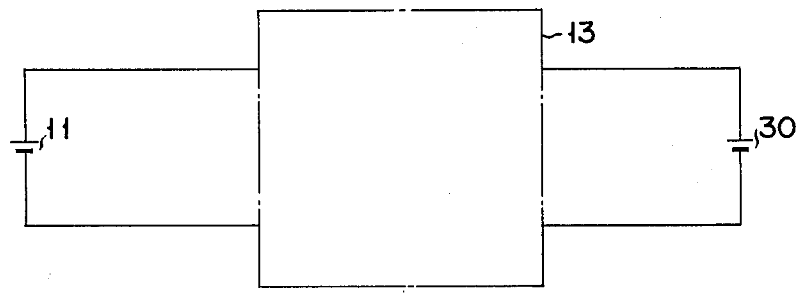
FIG. 4 is a circuit diagram showing an equivalent circuit to the circuit of FIG. 1 when a saturable element therein is saturated.

Now, the operation of the high frequency switching circuit including the magnetic amplifier will be described. The transistor 12 is on-off operated as a pulse train P having a predetermined period and a predetermined pulse width is supplied to its base. When the transistor 12 is turned on, the rectifier diode 21 is also turned on as is apparent from the polarity of the transformer 13. When a transient state of the high frequency switching circuit is over and a steady state sets in, the parallel circuit constituted by the filtering capacitor 23 and load 22 is now equivalent to a battery. FIG. 1 shows an equivalent circuit of the parallel circuit in this state. It is assumed, however, that the transformer 13 is an ideal transformer and the battery 30 is an equivalent battery constituted by the filtering capacitor 23 and load 22. In the initial state in the conduction of the transistor 12, the saturable reactor 17 is not saturated, so that the impedance of the reactor 17 is very high. In this state, the current from the power supply is thus substantially the current through the excitation inductance L1 of the transformer 13. This current is shown in a period $t0$–$t_c$ is shown by a solid plot in (a) in FIG. 2. When the saturable reactor 17 is subsequently saturated, the impedance of the reactor 17 is substantially reduced to zero. FIG. 4 shows an equivalent circuit of the switching circuit of FIG. 1 at this time. In this state of the circuit, the current that has been flowing from the power supply 11 through the leakage inductance L2 into the equivalent battery 30 sharply turns to flow to the excitation inductance L1. The current supplied to the excitation inductance L1 in the period $t_c$–$t_{on}$ is shown by the solid plot in (a) in FIG. 2. In the period $t_c$–$t_{on}$, the terminal voltage across the saturable reactor 17 is substantially zero.

Figure 5:
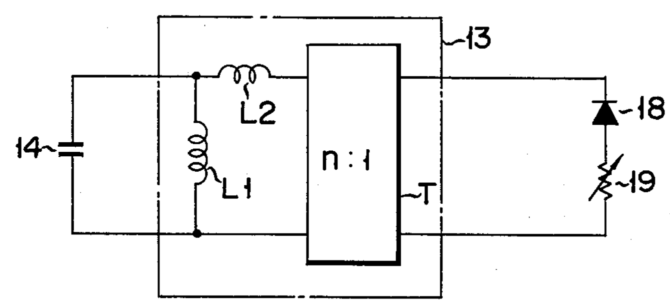
FIG. 5 is a circuit diagram showing an equivalent circuit to the circuit of FIG. 1 when the switching element therein is turned off.
Figure 6:
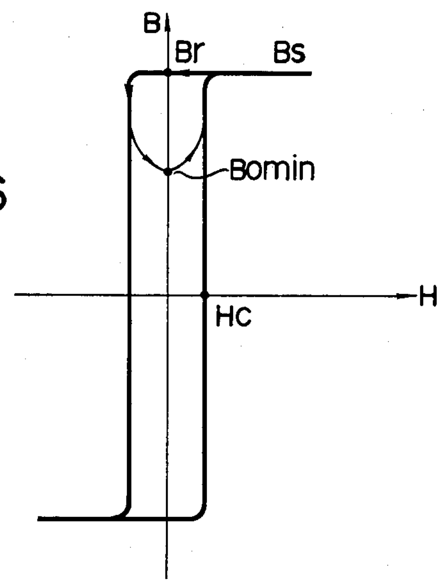
FIG. 6 is a graph showing the hysteresis curve of a saturable reactor in magnetic amplifier in the circuit of FIG. 1.

When the transistor 12 is turned off, the power supply 11 is disconnected from the high frequency switching circuit. FIG. 5 shows an equivalent circuit of the switching circuit of FIG. 1 at the time, the saturable reactor 17 is saturated. In this state, the sum of the excitation current through the transformer 13 and the current through the load 22 at the instant $t_{on}$ flows into the resonance capacitor 14, and the terminal voltage across the resonance capacitor 14 is going to change along the arc of the resonance waveform shown by the dashed plot in (b) in FIG. 2. However, since in this state the diode 18 is forwardly biased, the diode 18 is turned on. Thus, a reverse current is caused to flow through the diode 18 and variable resistor 19 into the reactor 17. In other words, the current through the leakage inductance L2 and the current that is flowing through the variable resistor 19 and opposite in direction to the current through the leakage inductance L2 are superimposed upon each other in flowing through the saturable reactor 17. During the period $t_{on}$–$t_m$ from the instant when current is caused to flow from the leakage inductance L2 through the saturable reactor 17 till the instant when the current through the leakage inductance L2 becomes zero, the magnetic flux produced by the saturable reactor 17 changes in a manner as shown in FIG. 6. As is shown, it gradually returns from the saturated magnetic flux density Bs to the active region and proceeds up to residual magnetic flux density Br. From the saturated magnetic flux density Bs till the residual magnetic flux density Br, the magnetic flux density usually changes substantially flatly, and the impedance between the terminals of the saturable reactor 17 is extremely low. Therefore, during this period $t_{on}$–$t_m$ only a low voltage (reset voltage) as shown in (a) in FIG. 2 appears across the saturable reactor 17. After the leakage inductance current has completely flown out, the magnetic flux density provided by the saturable reactor 17 is determined by the magnetic flux provided by a flyback pulse induced in the secondary winding $13_2$ of the transformer 13. This magnetic flux density becomes lower than the residual magnetic flux density and changes within the active region. The minimum magnetic flux density Bomin is equal to the quotient of division of the area B of the voltage waveform shown in (b) in FIG. 2 by the turns number $\mu$ of the coil of the saturable reactor 17 and the sectional area S of the core of the reactor 17. After an instant $t_d$, the flux density provided by the saturable reactor 17 turns to increase again since a positive potential is applied to the reactor 17. During the period from the instant $t_d$ till an instant $T+t_c$, when the voltage area A becomes equal to the aforementioned area B, the saturable reactor 17 is saturated, so that the impedance across the reactor 17 substantially becomes zero. Thus, the circuit of FIG. 1 is equivalent to the circuit of FIG. 4, and voltage as shown in (c) in FIG. 2 is supplied to the load 22. This voltage can be controlled by the variable resistor 19. By adjusting the variable resistor 19 the area B of the negative voltage waveform is changed to change the area A of the positive voltage waveform. Consequently, the period during which the saturable reactor 17 is changed, whereby the power supplied to the load 22 is controlled.

As has been shown, with the magnetic amplifier 20 provided on the secondary side of the transformer 13, it is possible to obtain power control with high power conversion efficiency and over a wide range.

Figure 7:
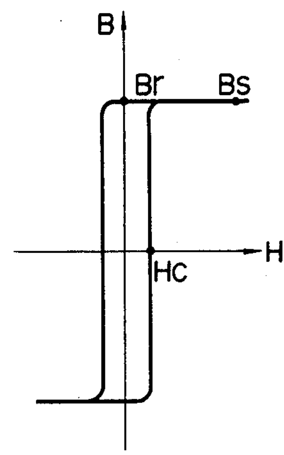
FIG. 7 is a graph showing the hysteresis curve of a saturable reactor constructed with a core material having a high rectangular ratio.
Figure 8:
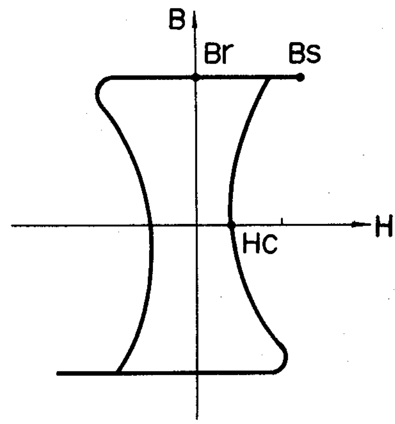
FIG. 8 is a graph showing the hysteresis curve of a saturable reactor operable at a high frequency.

In the above embodiment, as the saturable reactor is used one which has a hysteresis characteristic having a high reactangular ratio as shown in FIG. 6. As for the rectangular ratio, by using the usual material such as Sendelta (trade name) as the core material and taking the hysteresis characteristic as DC, a high value can be obtained. FIG. 7 shows a hysteresis curve obtained in this way. However, where the saturable reactor that is formed by using the aforementioned core material is driven at a high frequency of the order of 100 kHz, a hysteresis curve having projecting shoulders as shown in FIG. 8 results, that is, the coercive force is extremely increased. Such a hysteresis characteristic results from a peculiar character to the material that cannot be improved by reducing the core plate thickness even to the order of 10 microns.

Figure 9:
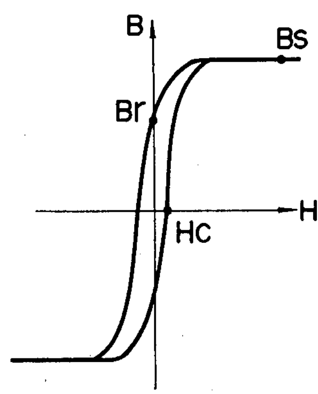
FIG. 9 is a graph showing the hysteresis curve constructed with a core material having a low rectangular ratio.
Figure 10:
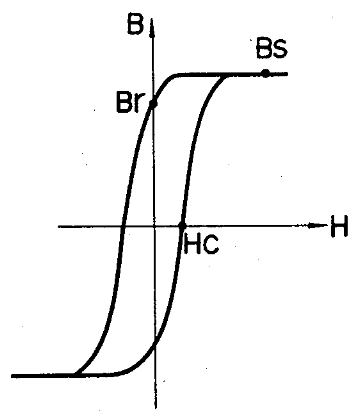
FIG. 10 is a graph showing the hysteresis curve obtained when a saturable reactor constructed with a core material having a low rectangular ratio is operated at a high frequency.

Meanwhile, such magnetic materials as square permalloy show a hysteresis characteristic as shown in FIG. 9. Although the rectangular ratio Br/Bs when the DC is 80%, which is below the DC rectangular ratio of Sendelta or like magnetic material, at high frequencies of the order of 50 kHz a hysteresis curve as shown in FIG. 10 can be obtained, with the rectangular ratio at this time being 94% higher than that of the DC. Thus, for high frequencies the aforementioned square permalloy and like materials can be sufficiently used for the magnetic amplifier. Beside the rectangular ratio, the coercive force is also an important factor of the core material of the magnetic amplifier. While a magnetic material that provides a high rectangular ratio at the DC provides a low coercive force at the DC, at high frequencies it shows an apparently very high coercive force Hc due to increased eddy current. On the other hand, square permalloy and like materials do not show high coercive force even at high frequencies so that they can be sufficiently used for high frequency magnetic amplifiers.

FIG. 11 shows the relation between the rectangular ratio Br/Bs and frequency for Sendelta (1) square permalloy (j) and cobalt-containing amorphous alloy (k) as typical magnetic amplifier materials. In the curves shown in FIG. 11, dashed portions represent regions incapable of measurement, that is, the function of the magnetic amplifier cannot be obtained for these regions. The rectangular ratio of the Co-containing amorphous alloy (k) is only 29% at the DC but is 94% at the operating frequency of 100 kHz. This means that a magnetic amplifier using Co-containing amorphous alloy (k) can sufficiently function as such at high frequencies.

FIG. 12 shows the relation between the coercive force Hc and frequency for the magnetic materials (i), (j) and (k) mentioned above. As is seen from this graph, square permalloy (j) and Co-containing amorphous alloy (k) have coercive force Hc of the order of 0.23 Oe at 50 KHz, but Sendelta (i) has a coercive force of 90 Oe and is incapable of measurement of the coercive force at frequencies above 20 kHz.

Figure 13:
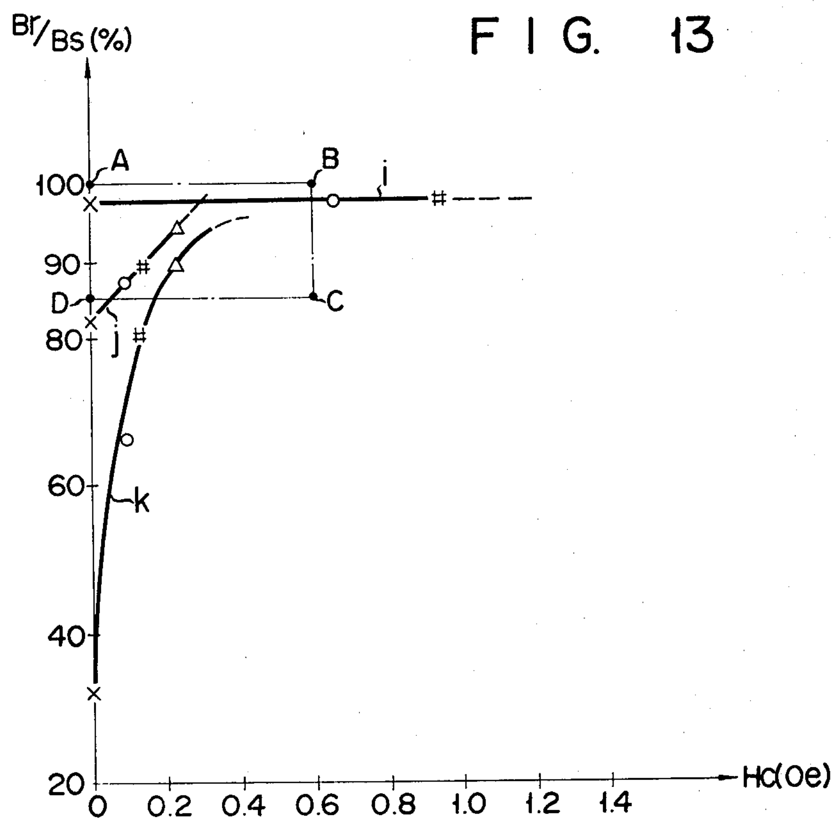
FIG. 13 is a graph showing rectangular ratios corresponding to coercive forces of various magnetic materials.
Figure 14:
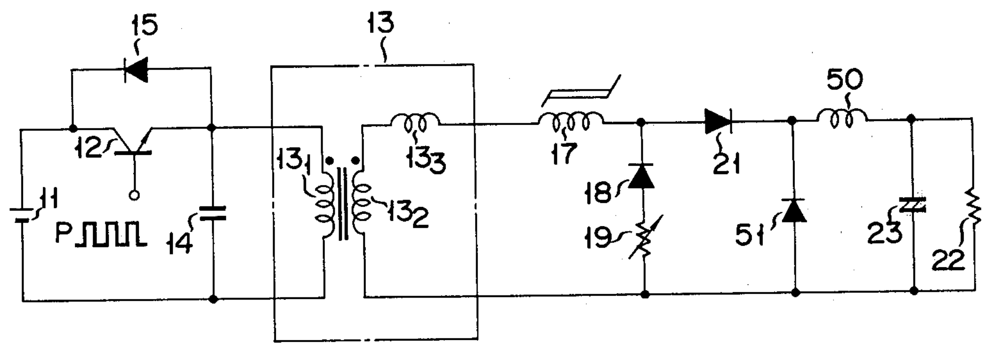
FIG. 14 is a circuit diagram showing another embodiment of the high frequency switching circuit according to the invention.

It will be understood from the above that as the magnetic material for the magnetic amplifier used for the high frequency switching circuit, those which have a coercive force Hc of 0.6 Oe or below at an operating frequency of 20 kHz or above and a rectangular ratio Br/Bs of 80% or below are suitable. In other words, magnetic materials having magnetic characteristics enclosed in a region of a rectangle ABCD in FIG. 13 are desired as the magnetic material of the high frequency magnetic amplifier. FIG. 13 shows the relation between the rectangular ratio Br/Bs and coercive force Hc with the frequency as the third parameter. Mark × designates a characteristic at DC, mark ○ at 10 kHz, mark # at 20 kHz, mark Δ at 50 kHz and, mark * at 100 kHz. If a magnetic amplifier which uses a magnetic material having a characteristic lying within the rectangle ABCD in FIG. 13 is used as the magnetic amplifier for the high frequency switching circuit of FIG. 1, it is possible to obtain a high frequency switching circuit which has high efficiency and operates stably. If a choke coil 50 and a reflux diode 51 are provided as shown in FIG. 14, the efficiency and stability of the high frequency switching circuit can be further improved.

What we claim is:

1. A high frequency switching circuit comprising:

a single-ended switching circuit including a transformer having a primary winding and a secondary side circuit, a switching element circuit connected between the primary winding of said transformer and a DC power supply and a resonance capacitor connected in parallel with said primary winding;

a rectifying/smoothing circuit including a filtering capacitor connected in parallel with a rectifying element and a load; and a magnetic amplifier connected between said secondary side circuit of said transformer and said rectifying/smoothing circuit.

2. The high frequency switching circuit according to claim 1, wherein said magnetic amplifier is constituted by a saturable reactor connected between an output terminal of the secondary side circuit of the transformer and said rectifying element, and reflux means connected in parallel with said rectifying/smoothing circuit for passing current stored in said saturable reactor and forming a closed circuit in co-operation with said rectifying/smoothing circuit.

3. The high frequency switching circuit according to claim 2, wherein said reflux means includes a diode and a variable resistor connected in series with said diode.

4. The high frequency switching circuit according to claim 1, 2 or 3, wherein said magnetic amplifier includes a saturable reactor constructed with a magnetic material providing a hysteresis rectangular ratio of 80% or above and a coercive force of 0.6 oersteds or below at an operating frequency of 20 kHz or above.

5. The high frequency switching circuit according to claim 1, 2 or 3, wherein said switching element circuit includes a switching element connected between said power supply and the primary winding of said transformer and on-off controlled with a paredetermined period and also with a predetermined conducting period and a damper diode connected across said switching element.

* * * * *